Figure 1:
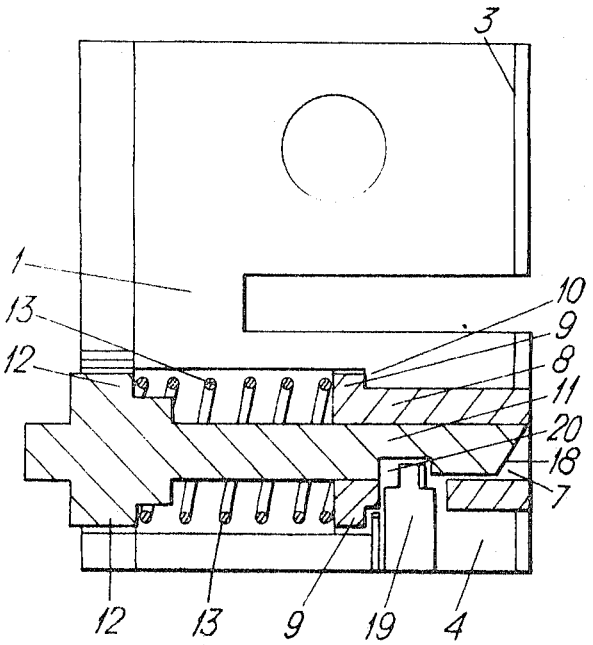
Figure 2:
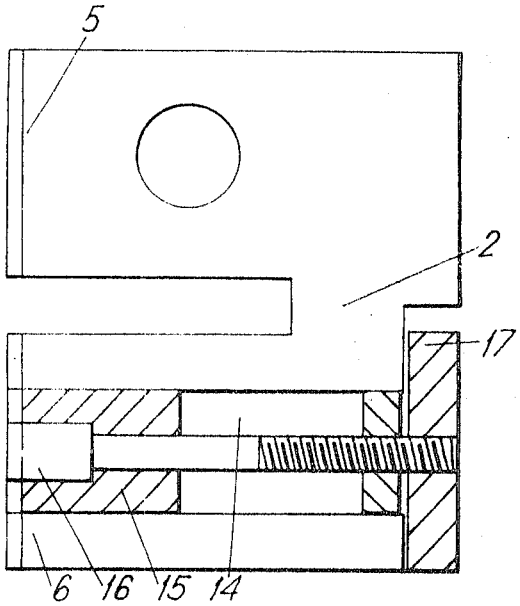

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JULY 20, 1971

888 O.G. 704

T888,003

SEALING JAWS FOR PACKAGING MACHINES

Michael John Herbert Haley and Barry James Oakley, Welwyn Garden City, England, assignors to Imperial Chemical Industries Limited, London, England

Filed Aug. 17, 1970, Ser. No. 64,318
Int. Cl. B22b *31/18, 31/20*
U.S. Cl. 156—515
1 Sheet Drawing. 2 Pages Specification

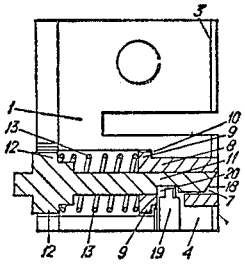

A hole surrounded by a plane ring is formed in a crimped web-like seal of one end of a form and fill package by the disclosed sealing jaws. The sealing jaws contain heating elements and have intermeshing saw-toothed surfaces and are movable towards and away from each other. One of the jaws carries a movable punch member which is retained within the jaw, the other jaw is formed with a cavity to receive the punch. After the surfaces of the two movable sealing jaws are together and the jaws are closed, the punch member is instantaneously activated thereby forming an opening in that portion of the material held between the jaws. Slideable bushings having substantially flat surfaces are provided about the punch member and the cavity to form the plane ring produced in the seal, the balance of the seal being a web-like crimped material. In cooperation with the movable jaws carrying the punch member there may also be provided an additional set of jaws spaced from and carried with the jaws carrying the punch member. In this manner the packaging material, such as polypropylene which is coated with a heat sealable material, is continuously placed between the sets of jaws and sealed, the jaws carrying the punch member forming the top seal of the package while the other set of jaws forming the bottom seal of the next package. The space between the two seals thus produced is next cut, thereby separating the bags.

The resulting crimped seal having an opening surrounded by a plane ring is useful for hanging or display bags such as those containing candy that are suspended from a wire passing through the hole formed in the top of the bag.

July 20, 1971 M. J. H. HALEY ET AL T888,003

SEALING JAWS FOR PACKAGING MACHINES

Filed Aug. 17, 1970

Inventor
MICHAEL JOHN HERBERT HALEY
BARRY JAMES OAKLEY
By
Cushman, Darby & Cushman
Attorneys